United States Patent [19]
Mull

[11] 3,785,203
[45] Jan. 15, 1974

[54] WAVE FORCE TRANSDUCER
[75] Inventor: Michael M. Mull, Van Nuys, Calif.
[73] Assignee: Mechanics Research, Inc., Los Angeles, Calif.
[22] Filed: Mar. 24, 1972
[21] Appl. No.: 237,869

[52] U.S. Cl. .............................. 73/170 A, 73/189
[51] Int. Cl. ............................................ G01p 5/02
[58] Field of Search ................. 73/170 A, 189, 188, 73/141 R

[56] References Cited
UNITED STATES PATENTS
3,121,329  10/1965  Bisberg ............................. 73/189
3,285,061  11/1966  Hegenbart .......................... 73/141
3,365,943  1/1968   Bloch .................................. 73/189

Primary Examiner—Jerry W. Myracle
Attorney—William A. Kemmel, Jr.

[57] ABSTRACT

A wave force transducer, including a shell mounted around a support column by a set of flexures which permit substantially only lateral movement of said shell and a set of hydraulic load cells spaced around said shell between said shell and support column which measure the total wave force acting upon said shell.

3 Claims, 5 Drawing Figures

PATENTED JAN 15 1974
3,785,203
SHEET 1 OF 2
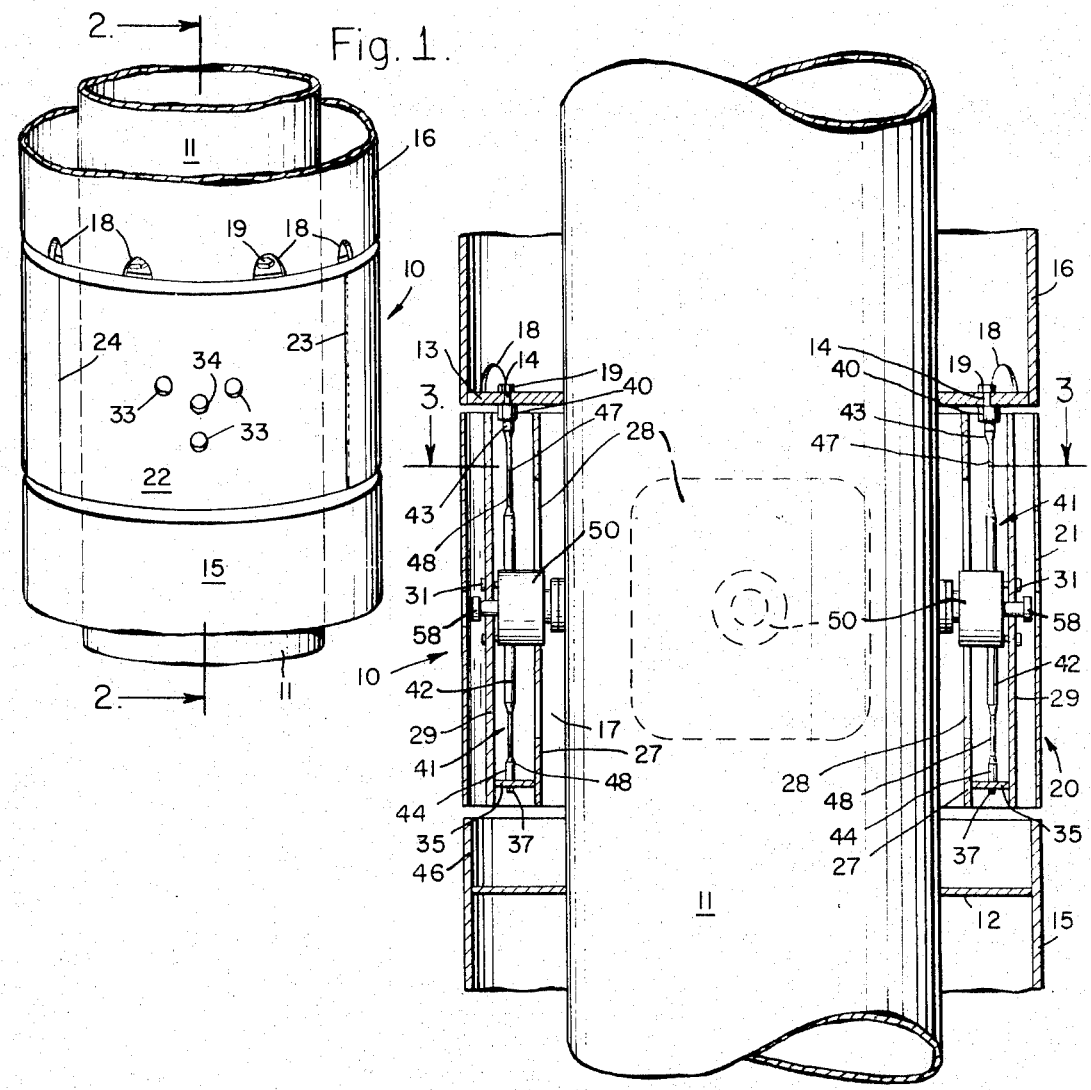
Fig. 1.
Fig. 2.
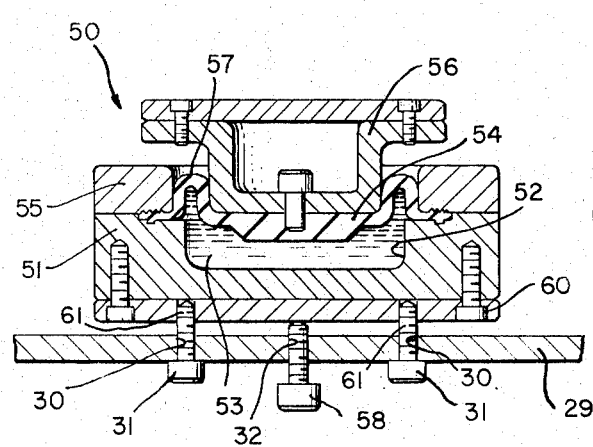
Fig. 4.

WAVE FORCE TRANSDUCER

BACKGROUND OF THE INVENTION

As late as 1950, those involved in constructing offshore structures such as drilling platforms for oil wells were faced with the problem of the substantial lack of information concerning the size of the ocean waves which could be expected, and the forces which such waves would exert on the structure. For example, as noted in the paper entitled "Measured Wave Force Data On OffShore Platforms" by L.W. Thrasher, et al. presented at the first annual Off-Shore Technology Conference in Houston, Tex., on May 18–29, 1969, the recommended wave force design values had a four to one spread. Consequently about then probably the first substantial effort to obtain reliable wave force data for designing offshore structures was instituted involving the use of a cantilever pile. One report of such effort is the report entitled "Analysis of Wave Forces On a 30-Inch Diameter Pile Under Confused Sea Conditions" by B. W. Wilson, Technical Memorandum No. 15, U.S. Army Coastal Engineering Research Center, dated October, 1965, which describes the structure and the difficulties encountered. Among such difficulties was that the cantilever pile measured only the total force acting on the pile and gave no information with respect to the force at various depths. More important, substantial vibration problems were encountered which not only made data reduction difficult, but also introduced large errors in the measured forces. Finally, the equipment had substantially no overload capability, and its fatigue life was poor which resulted in the loss of several cantilever piles. Because of such problems, other wave force transducer designs were evolved. One design for such wave force transducer is that described by Wiegel et al. in the article entitled "Ocean Wave Forces on Circular Cylindrical Piles," published in the Journal of the Hydraulics Division of the American Society of Civil Engineers, Vol. 83, No. HY2- April, 1957, wherein a test pile with an integral wave force meter is described. Such wave force meter involves measuring the total wave force on a cylindrical test section whose supporting test bars have strain gauges attached thereto, and the output of the strain gauges is measured in a conventional fashion. While such arrangement permitted the measurement of total wave force at various depths, with only average complexity of data reduction, such design did have vibration problems and fatigue life problems, as well as only limited overload capability. Also, since the wave force meters were an integral part of the test pile, the construction, assembly and installation of such test piles were not only difficult but also the operation of such facility was difficult because repairs of inoperative meters were impossible to make and because the rubber seals between the meters and the test piles were subject to leakage, and such leakage introduced error in the data output. Another design for a wave force transducer is described by Russell et al in the article entitled "Ocean Wave Force Instrumentation," published in the Journal of Waterways and Harbors Division, proceedings of the American Society of Civil Engineers, Vol. 92, No. WW 4, November, 1966, wherein a clamp-on wave force meter is described. As set forth in such article, each wave force meter consisted of 16 independent pressure transducers equally spaced around the periphery of a split cylindrical stainless steel shell which was clamped around a pile. While such arrangement has advantages, such as permitting the measurement of force at various depths, elimination of vibration problems and good fatigue life and overload capability, it did have the disadvantages of measuring only the normal pressure forces and not responding to tangential sheer forces. And, more important, a quite complex structure and wiring system which resulted in complex data reduction problems and the problems of insuring that the electrical system utilized to measure and transmit the data was not affected by the severe operating environment.

Consequently, an object of the present invention is a wave force transducer adapted to measure the total wave force with high accuracy at various depths without vibration problems but with good overload capability and fatigue life.

Another object of the present invention is a wave force transducer which yields the foregoing advantages but which also is simple to construct and operate and which produces relatively simple data output to minimize the data reduction problems.

Still another object of the present invention is a wave force transducer which utilizes a vibration damping hydraulic sensing element and thereby avoids the problems of operating an electrical system immersed in the severe environment of the ocean and simplifies the testing and calibration of the system.

Other objections and advantages of the present invention will be readily apparent from the following description and drawings which illustrate a preferred exemplary embodiment of the present invention.

SUMMARY OF THE INVENTION

In summary, the present invention involves a wave force transducer having a shell mounted adjacent to and enclosing a support column with such shell support by a set of flexures, connecting the shell to the support column. Such flexures adapted to permit lateral movement of the shell with respect to the support column but prevent verticle or tilting movement of the shell with respect to the support column. Also connected between the shell and support column is at least one hydraulic load cell adapted to measure the total wave force acting upon the shell.

In order to facilitate understanding of the present invention, reference will now be made to the appended drawings of the preferred specific embodiment of the present invention. Such drawings, like the preceding summary, should not be construed as limiting the present invention which is properly set forth in the appended claims.

DESCRIPTION OF THE DRAWINGS

FIG. 1 is a perspective view of the wave force transducer of the present invention mounted on a support pipe.

FIG. 2 is a cross sectional view of the wave force transducer shown in FIG. 1 taken along the lines 2—2 of FIG. 1.

FIG. 4 is a cross sectional view of the hydraulic load cell portion of FIG. 2, taken along the lines 4—4 of FIG. 2.

DESCRIPTION OF THE PREFERRED EMBODIMENT OF THE PRESENT INVENTION

Figure 3:
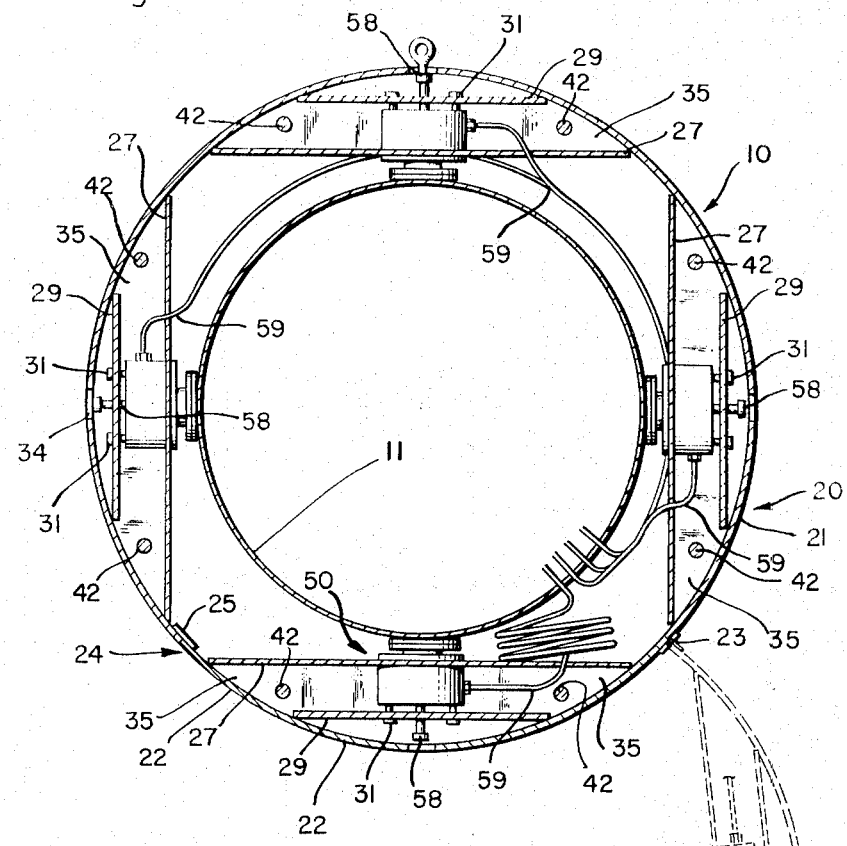
FIG. 3 is a cross sectional view of the wave force transducer of FIG. 2 taken along the lines 3—3 of FIG. 2 and with a portion thereof shown in an alternate position by a dashed line.
Figure 5:
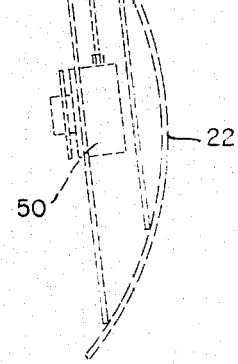
FIG. 5 is a partial side view of the hydraulic load cell illustrating its method of attachment to its support structure.
Figure 5:
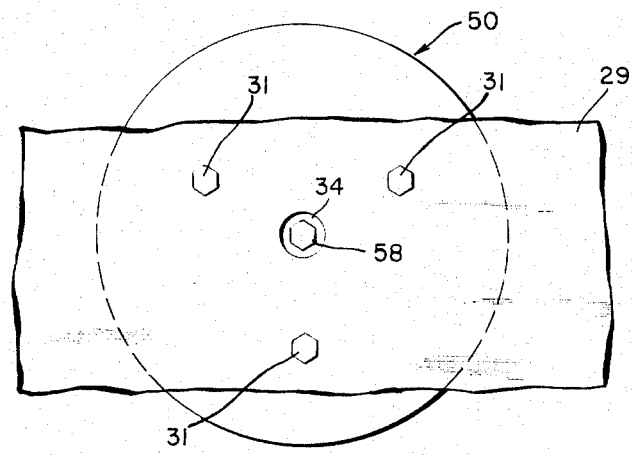

As illustrated in FIGS. 1–5, the wave force transducer 10 is mounted on a central support column 11, having a support flange 12 and a mounting bulkhead 13, extending therefrom with said bulkhead having a series of bores 14 therein equally spaced around the circumference of the bulkhead and extending axially parallel to the axis of the support column. Also mounted on the support column 11 is a spaced pair of inactive cylindrical housings 15 and 16, having the same external diameter as the wave force transducer 10 and forming a recess 17 around the support column 11 adapted to receive the wave force transducer 10. In the cylindrical housing 16 adjacent to the mounting bulkhead 13 and each of the bores 14 is a series of access openings 18, adapted to permit insertion of bolts 19 in bores 14 for the attachment of the wave force transducer 10 to the bulkhead 13.

The wave force transducer 10 comprises a shell 20, adapted to be mounted adjacent to and at least partially enclose the support column 11. The shell 20 includes a cylindrical wall 21, encircling the support column 11 and having a door 22 forming a quadrant thereof adapted to permit the installation of the shell 21 around the support column 11. The door 22 is attached along one edge by a continuous hinge 23 to the wall 21 and adapted to be attached along the opposite edge to the wall 21 by a lap joint closure 24 wherein a backing strip 25 is attached to the interior surface of the wall 21 and overlaps the connecting line between the wall 21 and the door 22. The door 22 is connected to the backing strip 25 by a series of countersunk flat head screws (not shown) to present a smooth exterior surface around the wall 21. On the inner surface of the wall 21 and spaced at 90° intervals around the wall 21 is mounted a set of four reinforcing panels 27 which extend longitudinally along the entire length of the wall 21 and laterally substantially equal to a quadrant of the wall 21. In the central portion of each reinforcing panel 27 is an aperture 28 adapted to permit the hydraulic load cell 50 to contact the support column 11. Between each reinforcing panel 27 and the wall 21, and opposite each aperture 28 is a support place 29, mounted on the wall 21, and extending longitudinally substantially along the entire length of the wall 21 and laterally over approximately the central 30° of the quadrant. The support plate 29 is adapted to support the hydraulic load cell 50 in contact with the support column 11 and for such purpose a set of holes 30 is formed in support plate 29 through which adjustment bolts 31 are inserted to attach the hydraulic load cell 50 to the support plate 29. In addition, the support plate 29 has a central hole 32, adapted to permit the passage therethrough of the load cell adjustment screw 58. Opposite the holes 31 in the support plate 29 are corresponding holes 33 in the wall 21 to permit access to the bolts adjustment 31. Similarly, opposite the hole 32 is an access hole 34 in the wall 21, adapted to permit access to the load cell adjustment screw 58. Adjacent the lower end of the wall 21 and mounted between the wall 21 and the reinforcing panel 27 is a platform 35 which is adapted to support the lower end of each flexure 41 and which extends perpendicular to the axis of the wall 21. Adjacent each end of each platform 35 are holes (not shown) therein through which bolts 37 are inserted to join the flexures 41 to the shell 20.

A set of flexures is connected between the shell 20 and the mounting bulkhead 13 of the support column 11 and is adapted to permit lateral movement of the shell 20 with respect to the support column 11 and prevent vertical or tilting movement of the shell 20 with respect to the support column 11. Each flexure 41 consists of a rod 42, having an upper end 43 and a lower end 44 in which are formed threaded socket (not shown) adapted to receive bolts 9 and 37, respectively, to attach the flexure 41 to the mounting bulkhead 13 of the support column 11 and to the platform 35 of the shell 20, respectively. In addition, threaded on to the upper end 43 of the rod 42 and abutting the mounting bulkhead 13 is a nut 40 adapted to permit adjustment of the length of the rod 42. Adjacent the upper end 43 and the lower end 44 of the rod 42 are elongated lengths of reduced cross section or necks 47 and 48 respectively.

Mounted on each support plate 29 by bolts 31 is a load cell 50, connected between the shell 20 and the support column 11 and adapted to measure the total wave force acting upon the shell 20. Each of the hydraulic load cells 50 comprises a casing 51 having a cylindrical chamber 52 filled with hydraulic liquid 53. An extensible diaphragm 54 is attached to the casing 51 by retainer ring 55 which seals one end of the cylindrical chamber 52. A load piston 56 is mounted in the cylindrical chamber 52 attached to the diaphragm 54 and is adapted to compress the hydraulic liquid 53 in the chamber 52. The diaphragm 54 has a U shaped annulus 57 between the piston 56 and chamber 52 which is adapted to permit relative motion between the piston 56 and the chamber 52, substantially free from friction and without stretch in the diaphragm 54. The load cell 50 has an adjustment screw 58 opposite the piston 56 adjacent the wall 21 to permit adjustment of the load cell An adapter plate 60 is mounted on the casing 51 of the load cell 50 to accomodate holes 61 for adjustment bolts 31. Screw 58 pushes against adapter plate 60 and bolts 31 pull against adapter plate 60. Thus, by differentially adjusting the screw 58 and bolts 31, the load cell can be adjusted in and out against the support column 11. Each pair of load cells spaced apart by 180° are connected by rigid metal tubing to opposite sides of a conventional hydraulic differential pressure transducer mounted a convenient distance from the transducer. The metal tubing is rigid to minimize the volumetric change with respect to pressure to reduce the diaphragm stroke of the load cells which improves the linearity of the load cell.

A specific example of the above described wave force transducer 10 has been designed and constructed for mounting on a 24 inch O.D. pipe 11 having 36 inch O.D. pipe attached to the mounting bulkheads 13 as the adjoining inactive housings 15 and 16. The wall 21 of the shell 20 was 24 inches in height and 36 inch O.D. and constructed from ¼ inch cold rolled mild steel plate. Similarly, the reinforcing panel 27 and platform 35 were formed out of ¼ inch steel plate, while the support plate 29 is formed out of ⅜ inch steel plate. The flexure 41 were formed out of a ¾ inch diameter, 24 inches long steel rod, stainless steel type 17-4PH condition H1150. Spaced 2 inches from each end of each rod 42 were neck 47 and 48 each having a total length of 4.62 inches, a minimum diameter of 0.188 inches and a taper at each end with a 1 inch radius. The hydraulic load cell used was modified from a model produced by the Martin Decker Company (Long Beach, Calif.) with modifications involving attachment of a load button to the normal loading piston and reducing the diameter of the loading piston so that the area between the retaining ring and the load piston was minimized to prevent possible jamming.

The installation and operation of the wave force transducer 10 is substantially apparent from the foregoing description of its construction. After the four load cells 50 are mounted on their respective supporting plates 29 and the eight flexures 41 are mounted on their respective platforms 35, the shell 20 is installed around the support cylinder 11 by temporarily opening the door 22, inserting the shell 20 onto the column between the inactive cylindrical housings 15 and 16 in the recess 17 closing and fastening the door 22. Next the upper ends 43 of the flexures 41 are attached to the mounting bulkhead 13 by bolts 19 which are manipulated through the access openings 18. After installation, the tubing from each pair of transducers is connected across a differential transducer and calibrated. The resulting pressure transducer output provides the magnitude and direction (plus or minus) of the wave force on the transducer as a function of time but cancels any pressure change on the load cells from the hydrostatic head changes as the wave passes by the wave force transducer.

It will be appreciated that many other specific embodiments of the present invention will be obvious to one skilled in the art in view of the disclosure of the present invention. For example, only a portion of the shell with one or an opposing pair of hydraulic load cells may be utilized. Likewise, the flexures may employ other flexible joint arrangements such as ball and socket joints.

There are many features of the present invention which clearly show the significant advance which the present invention achieves over the prior art. Consequently, only a few of the more outstanding features will be pointed out to illustrate the unexpected and unusual results obtained by the present invention. One feature of the present invention is that both the total wave force and direction are measured utilizing an extremely simple inexpensive structure which is not only simple to install and operate but also provides data which is relatively simple to record and reduce to useable form. Another feature of the present invention is that it permits measurement of the total wave force at various depths with no vibration problems and excellent overload capability and fatigue life. Still another feature of the present invention is utilizing a hydraulic sensing element having minimal frictional data distortion to permit accurate data collection under severe operating conditions.

It will be understood that the foregoing description and drawings are only illustrative of the present invention, and it is not intended that the present invention be limited thereto. All substitutions, alterations, and modifications of the present invention which come within the scope of the following claims or to which the present invention is readily susceptible without departing from the spirit and scope of this disclosure as considered part of the present invention.

We claim:

1. A wave force transducer comprising:
   a. a shell adapted to be mounted adjacent to and at least partially enclose a support column;
   b. a set of flexures connected between and parallel to said shell and support column and adapted to permit lateral movement of said shell with respect to said support column and prevent vertical or tilting movement of said shell with respect to said support column; and
   c. at least one pair of hydraulic load cells located opposite each other on said shell, connected between said shell and support column and by rigid tubing to opposite sides of a hydraulic differential pressure transducer and adapted to measure the total wave force acting upon said shell.

2. A wave force transducer as stated in claim 1 wherein four of said hydraulic load cells are located at 90° intervals.

3. A wave force transducer comprising:
   a. a shell, adapted to be mounted adjacent to and encircling a support column, said shell having a door section adapted to permit installation of said shell around said support column;
   b. a set of flexures connected between said shell and support column and adapted to permit lateral movement of said shell with respect to said support column and prevent vertical or tilting movement of said shell with respect to said support column, each of said flexures consisting of a rod having a length of reduced cross section adjacent each end with one of said rod connected to said support column adjacent one end of said shell and the other end of said rod connected to the other end of said shell; and
   c. four hydraulic load cells are located at 90° intervals around said shell and each pair of hydraulic load cells spaced apart by 180 degrees are connected by rigid tubing to opposite sides of a hydraulic differential pressure transducer.

* * * * *